US012785117B2

(12) United States Patent
Omori

(10) Patent No.: US 12,785,117 B2
(45) Date of Patent: Nov. 3, 2026

(54) FUEL CELL SEPARATOR AND FUEL CELL STACK

(71) Applicant: HONDA MOTOR CO., LTD., Tokyo (JP)

(72) Inventor: Suguru Omori, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 878 days.

(21) Appl. No.: 18/090,920

(22) Filed: Dec. 29, 2022

(65) Prior Publication Data

US 2023/0223562 A1 Jul. 13, 2023

(30) Foreign Application Priority Data

Jan. 11, 2022 (JP) ................................ 2022-002158

(51) Int. Cl.
*H01M 8/0258* (2016.01)
*H01M 8/0206* (2016.01)
(Continued)

(52) U.S. Cl.
CPC ....... *H01M 8/0258* (2013.01); *H01M 8/0206* (2013.01); *H01M 8/0228* (2013.01);
(Continued)

(58) Field of Classification Search
CPC ............ H01M 8/0202; H01M 8/0206; H01M 8/0228; H01M 8/0247; H01M 8/0258;
(Continued)

(56) References Cited

U.S. PATENT DOCUMENTS

2007/0154758 A1* 7/2007 Kikuchi .............. H01M 8/2483 429/457
2019/0074525 A1 3/2019 Tomana et al.
(Continued)

FOREIGN PATENT DOCUMENTS

CN 109802156 A 5/2019
CN 110197913 A 9/2019
(Continued)

OTHER PUBLICATIONS

JP2004192996a, Horigushi, et al., “Fuel cell device”, machine English translation retrieved from https://worldwide.espacenet.com/ Date: Mar. 12, 2026 (Year: 2004).*
(Continued)

*Primary Examiner* — Tiffany Legette
*Assistant Examiner* — Jared Hansen
(74) *Attorney, Agent, or Firm* — Carrier, Shende & Associates P.C.; Fulchand P. Shende; Joseph P. Carrier

(57) ABSTRACT

A fuel cell separator includes a coolant flow field formed between first and second metal separator plates. A first communication hole is formed in an outer peripheral wall of each of passage sealing beads that surround respectively an air vent passage and a coolant drain passage which are formed so as to penetrate in a separator thickness direction. A second communication hole is formed in an inner peripheral wall of each of the passage sealing beads. The first communication hole and the second communication hole are positioned to be displaced from each other in an extending direction of a first internal channel or a second internal channel.

11 Claims, 10 Drawing Sheets

(51) Int. Cl.

| | |
|---|---|
| ***H01M 8/0228*** | (2016.01) |
| ***H01M 8/0267*** | (2016.01) |
| ***H01M 8/0273*** | (2016.01) |
| ***H01M 8/0276*** | (2016.01) |
| ***H01M 8/04029*** | (2016.01) |
| ***H01M 8/241*** | (2016.01) |
| ***H01M 8/2457*** | (2016.01) |
| ***H01M 8/2483*** | (2016.01) |

(52) U.S. Cl.
CPC ....... *H01M 8/0267* (2013.01); *H01M 8/0273* (2013.01); *H01M 8/0276* (2013.01); *H01M 8/04029* (2013.01); *H01M 8/241* (2013.01); *H01M 8/2457* (2016.02); *H01M 8/2483* (2016.02)

(58) Field of Classification Search
CPC ............ H01M 8/0267; H01M 8/0271; H01M 8/0273; H01M 8/0276; H01M 8/0256; H01M 8/04029; H01M 8/241; H01M 8/2465; H01M 8/2457; H01M 8/2483; H01M 2008/1095; Y02E 60/50
See application file for complete search history.

(56) References Cited

U.S. PATENT DOCUMENTS

| | | | | |
|---|---|---|---|---|
| 2019/0157690 | A1 | 5/2019 | Ishida et al. | |
| 2019/0214654 | A1 | 7/2019 | Nishida et al. | |
| 2020/0014041 | A1 * | 1/2020 | Goto ................... | H01M 8/2483 |
| 2020/0020958 | A1 * | 1/2020 | Oyama ............... | H01M 8/1004 |
| 2021/0194020 | A1 | 6/2021 | Suzuki et al. | |

FOREIGN PATENT DOCUMENTS

| | | | | |
|---|---|---|---|---|
| CN | 113097526 | A | | 7/2021 |
| JP | 2004192996 | A | * | 7/2004 |
| JP | 2019-046770 | A | | 3/2019 |
| JP | 2019-096382 | A | | 6/2019 |
| JP | 2021-009808 | A | | 1/2021 |

OTHER PUBLICATIONS

Office Action and Search Report dated May 14, 2025 issued in the corresponding Chinese Patent Application No. 202310026192.2 with the English machine translation thereof.

* cited by examiner

FUEL CELL SEPARATOR AND FUEL CELL STACK

CROSS-REFERENCE TO RELATED APPLICATIONS

This application is based upon and claims the benefit of priority from Japanese Patent Application No. 2022-002158 filed on Jan. 11, 2022, the contents of which are incorporated herein by reference.

BACKGROUND OF THE INVENTION

Field of the Invention

The present invention relates to a fuel cell separator and a fuel cell stack.

Description of the Related Art

In recent years, fuel cell vehicles (FCV: Fuel Cell Vehicle) using hydrogen as fuel have attracted attention as vehicles for reducing adverse effects on the global environment. The fuel cell vehicle supplies air (including oxygen) and hydrogen gas as a fuel gas to a fuel cell. The fuel cell vehicle travels by driving an electric motor using electricity generated by the fuel cell. For this reason, unlike gasoline vehicles, the fuel cell vehicles do not discharge carbon dioxide (CO2), NOx, SOx, and the like, but discharge only water, so that the fuel cell vehicles are regarded as environmentally friendly vehicles.

For example, JP 6499247 B2 discloses a fuel cell stack provided with a fuel cell separator. A fuel cell separator is formed by joining two metal separator plates in a state of facing each other. Each of the metal separator plates includes, formed on one surface thereof, a reactant gas flow field for flowing a reactant gas, which is a fuel gas or an oxygen-containing gas. A coolant flow field is formed between the two metal separator plates.

In each of the metal separator plates, an air vent passage and a coolant drain passage are formed so as to penetrate in the separator thickness direction. Further, each of the metal separator plates is formed integrally with a bead projecting in a direction opposite to a direction toward the coolant flow field.

The bead includes a sealing bead, two passage sealing beads, and two connection beads. The sealing bead prevents leakage of the reactant gas. One of the passage sealing beads surrounds the air vent passage. The other passage sealing bead surrounds the coolant drain passage. One end of each connection bead is connected to the sealing bead. The other end of each connection bead is connected to the outer peripheral wall of each passage sealing bead.

The inner peripheral wall of one of the passage sealing beads is provided with a tunnel projecting toward the air vent passage. The inner peripheral wall of the other passage sealing bead is provided with a tunnel projecting toward the coolant drain passage. Each of the air vent passage and the coolant drain passage communicates with the internal space of the sealing bead via the internal space of the tunnel, the internal space of the passage sealing bead, and the internal space of the connection bead. That is, the first communication hole for establishing communication between the internal space of the passage sealing bead and the internal space of the connection bead is formed in the outer peripheral wall of the passage sealing bead. The inner peripheral wall of the passage sealing bead is provided with a second communication hole for establishing communication between the internal space of the passage sealing bead and the internal space of the tunnel. The first communication hole and the second communication hole are positioned to face each other.

In a state in which the fuel cell separators as described above are incorporated into a fuel cell stack, a compressive load in the separator thickness direction is applied to the fuel cell separators. At this time, the inner peripheral wall and the outer peripheral wall of the passage sealing bead are elastically deformed, and accordingly a reaction force is generated on the protruding end surface of the passage sealing bead. As a result, sealing is provided between the inside and the outside, of the portion surrounded by the passage sealing bead.

SUMMARY OF THE INVENTION

In the conventional technique as described above, the first communication hole and the second communication hole are positioned to face each other. In this case, when a compressive load in the stacking direction is applied to the fuel cell stack, a reaction force is less likely to be generated in a portion of the protruding end surface of the passage sealing bead that is adjacent to the first communication hole and the second communication hole. Consequently, there is a possibility that good sealing cannot be achieved over the entire circumference of the passage sealing bead.

An object of the present invention is to solve the aforementioned problem.

According to an aspect of the present invention, there is provided a fuel cell separator including two metal separator plates joined to each other, each of the two metal separator plates including a first surface formed with a reactant gas flow field configured to flow a reactant gas which is a fuel gas or an oxygen-containing gas and a second surface formed with a coolant flow field configured to flow a coolant, wherein the fuel cell separator includes a reactant gas passage that is formed so as to penetrate through the fuel cell separator in a separator thickness direction, the reactant gas passage communicating with the reactant gas flow field, and a bead is formed on the first surface so as to protrude therefrom, the bead including a sealing bead provided in order to prevent leakage of the reactant gas, wherein the fuel cell separator further includes at least one of an air vent passage or a coolant drain passage that is formed so as to penetrate through the fuel cell separator in the separator thickness direction, the second surface includes a connection channel formed by a recess forming a back of a protruding shape of the bead, at least one of the air vent passage or the coolant drain passage communicates with the coolant flow field via the connection channel, the sealing bead includes a passage sealing bead surrounding the air vent passage or the coolant drain passage, the passage sealing bead includes an outer peripheral wall and an inner peripheral wall that extend in pairs, and an internal channel that is formed between the outer peripheral wall and the inner peripheral wall and that extends so as to surround the air vent passage or the coolant drain passage, the outer peripheral wall includes a first communication hole configured to allow the internal channel of the passage sealing bead and the connection channel to communicate with each other, the inner peripheral wall includes a second communication hole configured to allow the internal channel of the passage sealing bead and the air vent passage or the coolant drain passage to communicate with each other, and the first communication hole and the second communication hole are displaced from each other in an extending direction of the internal channel.

According to another aspect of the present invention, there is provided a fuel cell stack including the above-described fuel cell separator and a membrane electrode assembly, wherein a plurality of the fuel cell separators and a plurality of the membrane electrode assemblies are stacked alternately.

According to the present invention, at least one of the air vent passage or the coolant drain passage is connected to the coolant flow field through the connection channel formed by the recess forming the back of the protruding shape of the bead. Therefore, the recesses on the back of the beads provided in the metal separator plate are utilized effectively, and it is possible to achieve a simple coolant flow field structure. In addition, the first communication hole and the second communication hole are displaced from each other in the extending direction of the internal channel. Therefore, when a compressive load in the stacking direction is applied to the fuel cell stack, it is possible to prevent the reaction force from becoming excessively small at the portion adjacent to the first communication hole and the portion adjacent to the second communication hole, of the protruding end surfaces of the passage sealing beads. Therefore, it is possible to satisfactorily achieve sealing over the entire circumference of each of the passage sealing beads.

The above and other objects features and advantages of the present invention will become more apparent from the following description when taken in conjunction with the accompanying drawings in which a preferred embodiment of the present invention is shown by way of illustrative example.

DETAILED DESCRIPTION OF THE INVENTION

Figure 1:
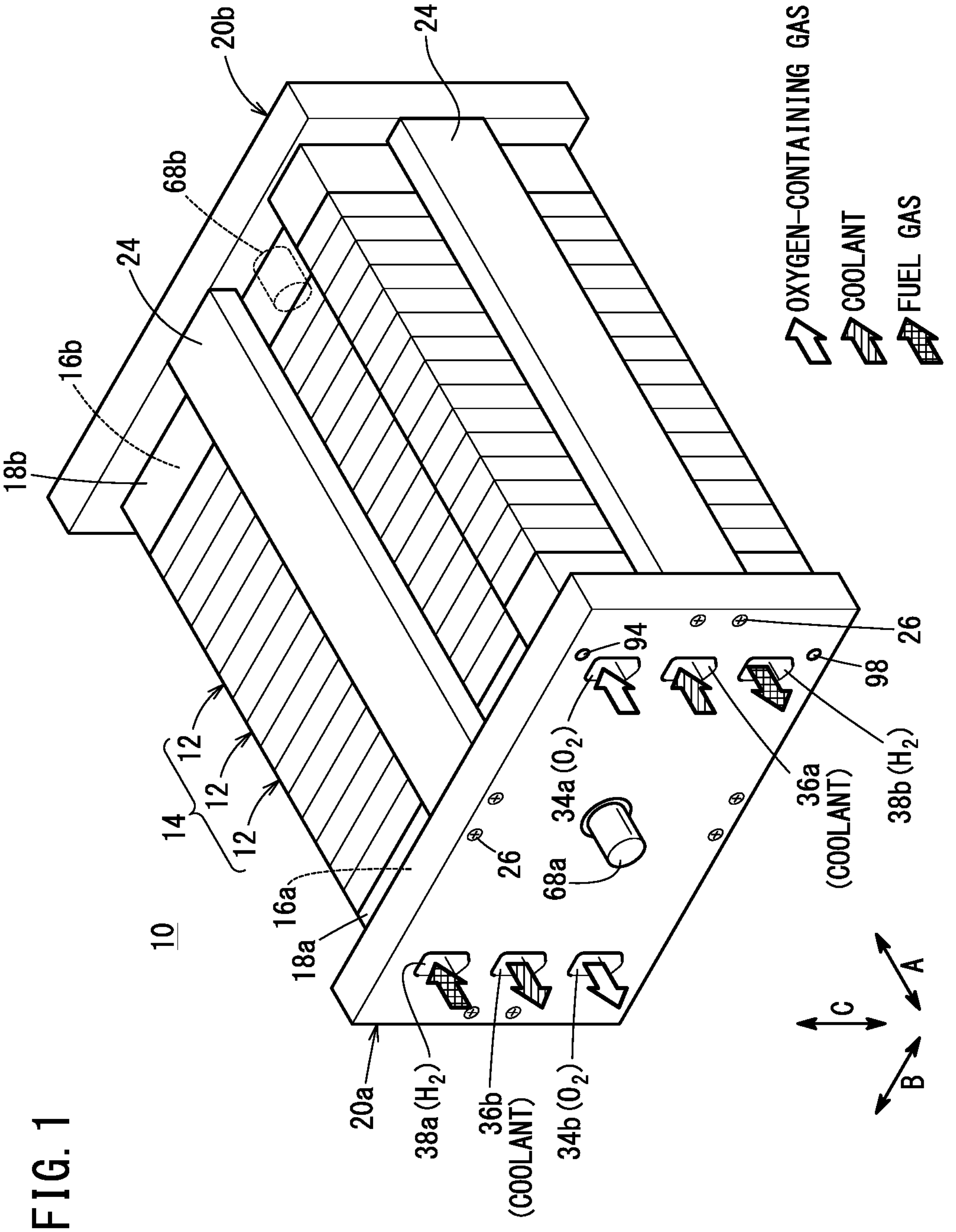
FIG. 1 is a perspective explanatory view of a fuel cell stack.

As shown in FIG. 1, a fuel cell stack 10 includes a stack body 14. The stack body 14 includes a plurality of power generation cells 12 stacked in a horizontal direction (arrow A direction). Each power generation cell 12 constitutes a unit fuel cell. The fuel cell stack 10, for example, is mounted in a fuel cell vehicle such as a fuel cell electric automobile (not shown). In the present embodiment, "downward" means downward (in the direction of gravity) in the installed state of the fuel cell stack 10, and "upward" means upward (in the direction opposite to the direction of gravity) in the installed state of the fuel cell stack 10.

A terminal plate 16*a*, an insulator 18*a*, and an end plate 20*a* are arranged in this order sequentially toward the outside on one end in the stacking direction (the direction of the arrow A) of the stack body 14. A terminal plate 16*b*, an insulator 18*b*, and an end plate 20*b* are arranged in this order sequentially toward the outside on the other end in the stacking direction of the stack body 14. Connecting bars 24 are disposed between each side of the end plate 20*a* and each side of the end plate 20*b*. Each of the terminal plates 16*a*, 16*b* is made of an electrically conductive material. The two terminal plates 16*a*, 16*b* includes, substantially in the center, respective terminals 68*a*, 68*b* that extend outwardly in the stacking direction.

The end plates 20*a* and 20*b* each have a horizontally long rectangular shape. Both ends of each connecting bar 24 are fixed to the respective inner surfaces of the end plates 20*a* and 20*b* by bolts 26. As a result, a compressive load in the stacking direction (the arrow A direction) is applied to the plurality of power generation cells 12. The fuel cell stack 10 may include a housing having the two end plates 20*a* and 20*b* as housing end plates. In this case, the stack body 14 is accommodated in the housing.

Figure 2:
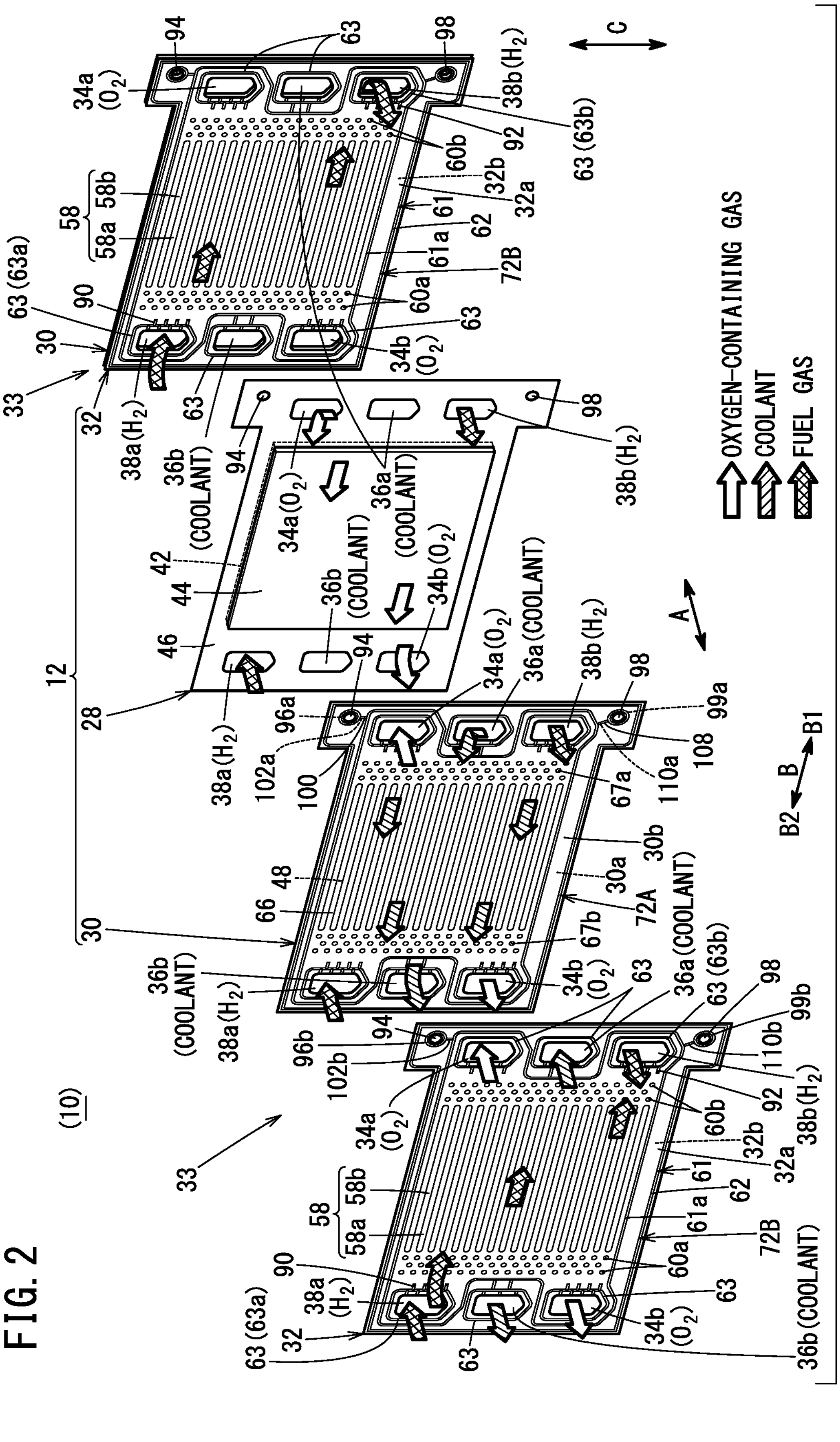
FIG. 2 is an exploded perspective view of a power generation cell constituting the fuel cell stack.

As shown in FIG. 2, the power generation cell 12 has a horizontally long rectangular shape. The power generation cell 12 includes a resin film equipped membrane electrode assembly (resin film equipped MEA) 28, a first metal separator plate 30, and a second metal separator plate 32. The first metal separator plate 30 is arranged on one surface side of the resin film equipped MEA 28. The second metal separator plate 32 is arranged on the other surface side of the resin film equipped MEA 28.

Each of the first metal separator plate 30 and the second metal separator plate 32 is formed by press-forming a metal thin plate into a corrugated shape in cross section. The metal thin plate may be, for example, a stainless steel plate whose surface is surface-treated for anti-corrosion or an aluminum plate whose surface is surface-treated for anti-corrosion. The fuel cell stack 10 includes fuel cell separators 33. The fuel cell separator 33 is a joint separator formed by integrally joining the first metal separator plate 30 and the second metal separator plate 32 adjacent to each other.

Each of the power generation cells 12 has an oxygen-containing gas supply passage 34*a*, a coolant supply passage 36*a*, and a fuel gas discharge passage 38*b* at one end portion thereof in the horizontal direction. The one end portion of each power generation cell 12 in the horizontal direction is an end portion of each power generation cell 12 in the arrow B1 direction. The oxygen-containing gas supply passage 34*a*, the coolant supply passage 36*a*, and the fuel gas discharge passage 38*b* are arranged in the vertical direction (the arrow C direction).

The plurality of oxygen-containing gas supply passages 34*a* communicate with each other in the direction indicated by the arrow A. The plurality of coolant supply passages 36*a* communicate with each other in the direction indicated by the arrow A. The plurality of fuel gas discharge passages 38*b* communicate with each other in the direction indicated by the arrow A. The oxygen-containing gas supply passage 34*a* is used for supplying an oxygen-containing gas, which is one reactant gas. The coolant supply passage 36*a* is used for supplying a coolant (for example, pure water, ethylene glycol, oil, or the like). The fuel gas discharge passage 38*b* is used for supplying a fuel gas (hydrogen-containing gas), which is the other reactant gas.

The other end portion of each power generation cell 12 in the horizontal direction has a fuel gas supply passage 38*a*, a coolant discharge passage 36*b*, and an oxygen-containing gas discharge passage 34*b*. The other end portion of each power generation cell 12 in the horizontal direction is an end portion of each power generation cell 12 in the arrow B2 direction. The fuel gas supply passage 38*a*, the coolant discharge passage 36*b*, and the oxygen-containing gas discharge passage 34*b* are arranged in the vertical direction (the arrow C direction).

The plurality of fuel gas supply passages 38*a* communicate with each other in the direction indicated by the arrow A. The plurality of coolant discharge passages 36*b* communicate with each other in the direction indicated by the arrow A. The plurality of oxygen-containing gas discharge passages 34*b* communicate with each other in the direction indicated by the arrow A. The fuel gas is supplied through the fuel gas supply passage 38*a*. The coolant is discharged through the coolant discharge passage 36*b*. The oxygen-containing gas is discharged through the oxygen-containing gas discharge passage 34*b*.

The oxygen-containing gas supply passage 34*a*, the oxygen-containing gas discharge passage 34*b*, the fuel gas supply passage 38*a*, and the fuel gas discharge passage 38*b* are flow paths for reactant gases. The arrangement, the shapes, the sizes of the oxygen-containing gas supply passage 34*a*, the oxygen-containing gas discharge passage 34*b*, the coolant supply passage 36*a*, the coolant discharge passage 36*b*, the fuel gas supply passage 38*a*, and the fuel gas discharge passage 38*b* are not limited to those shown in the present embodiment, and may be set appropriately depending on required specifications.

Figure 3:
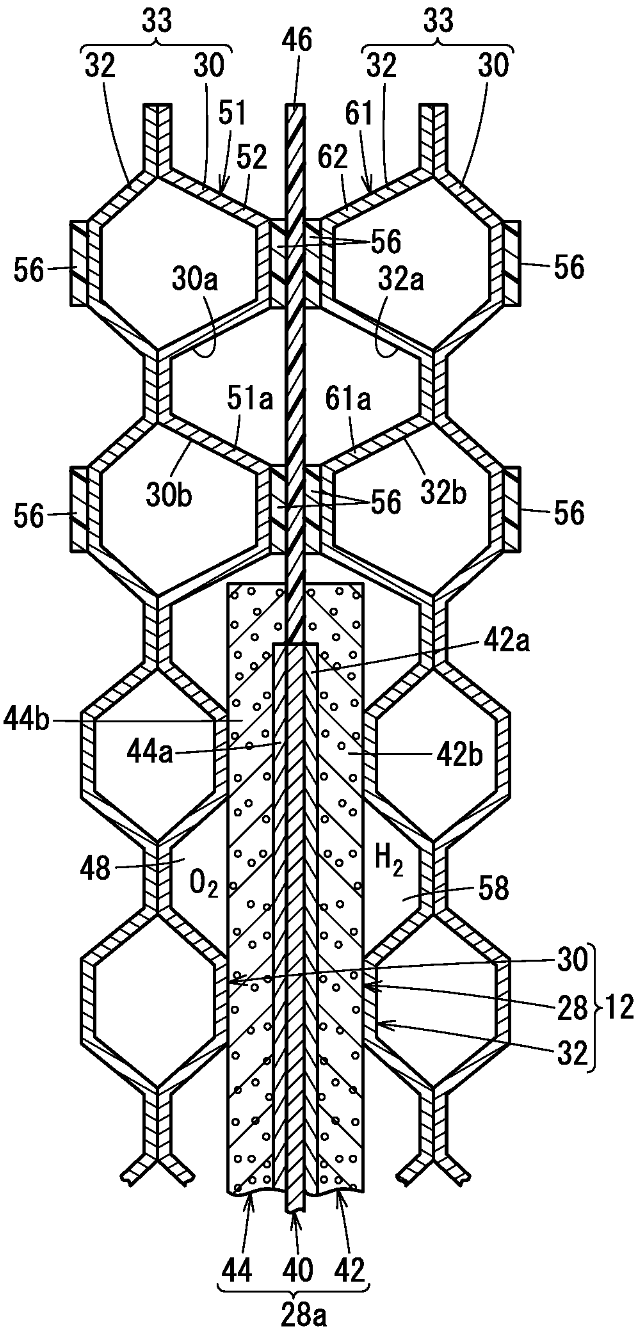
FIG. 3 is a schematic cross-sectional view of the power generation cell.

As shown in FIG. 3, the resin film equipped MEA 28 includes a membrane electrode assembly 28*a*, and a frame shaped resin film 46 provided on an outer periphery of the membrane electrode assembly 28*a*. The membrane electrode assembly 28*a* includes an electrolyte membrane 40, an anode 42, and a cathode 44. The anode 42 and the cathode 44 sandwich the electrolyte membrane 40 therebetween.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 may be a fluorine-based electrolyte membrane or an HC (hydrocarbon)-based electrolyte membrane.

The cathode 44 has a first electrode catalyst layer 44*a* and a first gas diffusion layer 44*b*. The first electrode catalyst layer 44*a* is joined to one surface of the electrolyte membrane 40. The first gas diffusion layer 44*b* is laminated on the first electrode catalyst layer 44*a*. The anode 42 has a second electrode catalyst layer 42*a* and a second gas diffusion layer 42*b*. The second electrode catalyst layer 42*a* is joined to the other surface of the electrolyte membrane 40. The second gas diffusion layer 42*b* is laminated on the second electrode catalyst layer 42*a*.

The inner end surface of the resin film 46 is positioned close to, overlapped with, or contacts the outer end surface of the electrolyte membrane 40. As shown in FIG. 2, at one end of the resin film 46 in the direction indicated by the arrow B1, the oxygen-containing gas supply passage 34*a*, the coolant supply passage 36*a*, and the fuel gas discharge passage 38*b* are provided. At the other end of the resin film 46 in the direction indicated by the arrow B2, the fuel gas supply passage 38*a*, the coolant discharge passage 36*b*, and the oxygen-containing gas discharge passage 34*b* are provided.

For example, the resin film 46 is made of PPS (polyphenylene sulfide), PPA (polyphthalamide), PEN (polyethylene naphthalate), PES (polyethersulfone), LCP (liquid crystal polymer), PVDF (polyvinylidene fluoride), a silicone resin, a fluororesin, m-PPE (modified polyphenylene ether), PET (polyethylene terephthalate), PBT (polybutylene terephthalate), or modified polyolefin. The power generation cell 12 may be configured such that the electrolyte membrane 40 protrudes outward from the anode 42 and the cathode 44 without using the resin film 46. In this case, a frame-shaped film may be provided on both surfaces of a portion of the electrolyte membrane 40 that protrudes outward from the anode 42 and the cathode 44.

As shown in FIG. 3, the first metal separator plate 30 has a front surface 30*a* as a first surface and a back surface 30*b* as a second surface. The front surface 30*a* faces toward the resin film equipped MEA 28. The back surface 30*b* faces toward the second metal separator plate 32.

Figure 4:
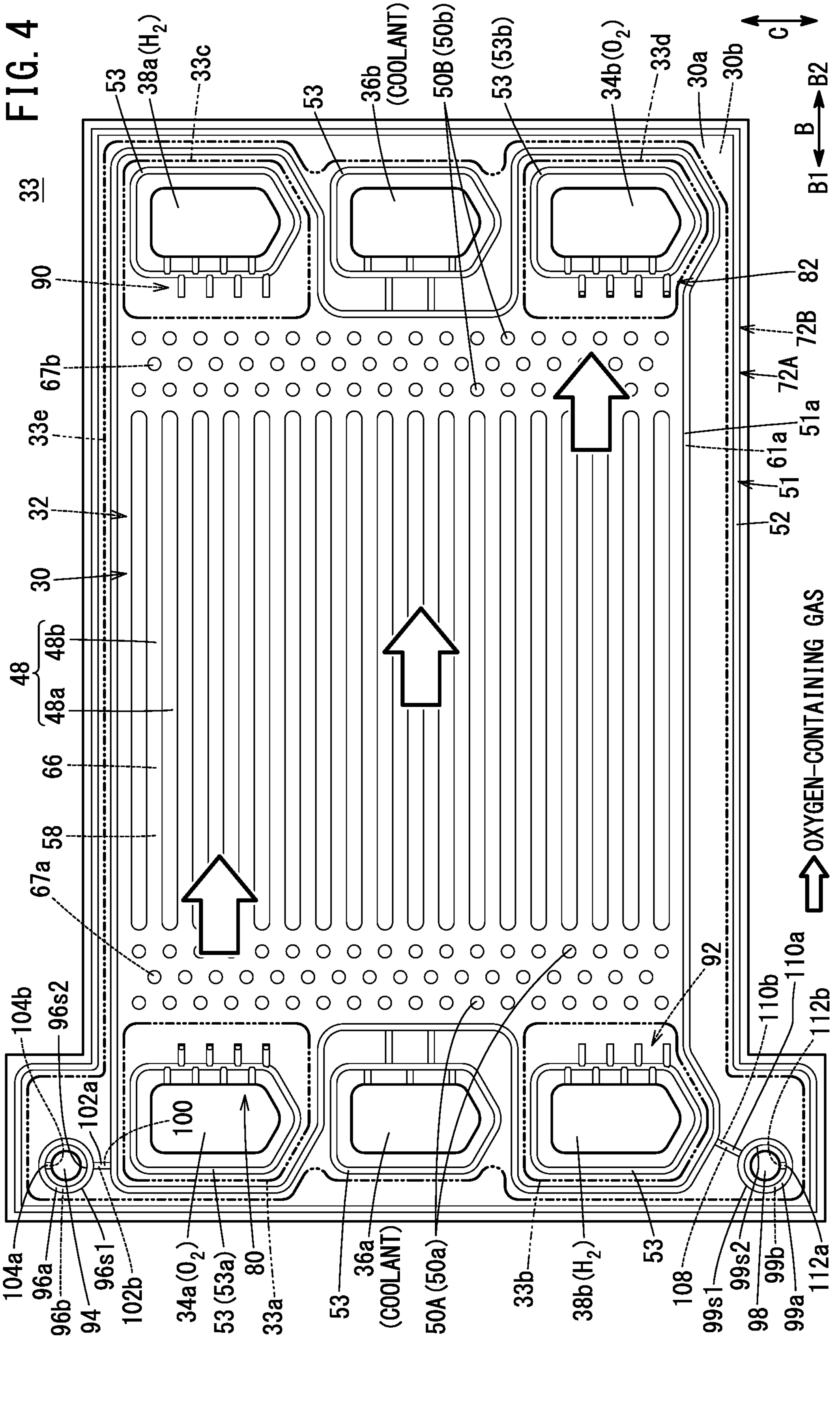
FIG. 4 is an explanatory front view of a fuel cell separator as viewed from a first metal separator plate side.

As shown in FIG. 4, for example, an oxygen-containing gas flow field 48 (reactant gas flow field) extending in the direction indicated by the arrow B is provided on the front surface 30*a* of the first metal separator plate 30. The oxygen-containing gas flow field 48 is connected to (in communication with) the oxygen-containing gas supply passage 34*a* and the oxygen-containing gas discharge passage 34*b*. The oxygen-containing gas flow field 48 supplies oxygen-containing gas to the cathode 44 (see FIG. 2). The oxygen-containing gas flow field 48 includes straight flow grooves 48*b* between a plurality of ridges 48*a*. Each ridge 48*a* extends in the arrow B direction. The oxygen-containing gas flow field 48 may have a plurality of wavy flow grooves instead of the plurality of straight flow grooves 48*b*.

On the front surface 30*a* of the first metal separator plate 30, an inlet buffer 50A is disposed between the oxygen-containing gas supply passage 34*a* and the oxygen containing gas flow field 48. The inlet buffer 50A has a plurality of emboss rows. Each emboss row includes a plurality of embossed portions 50*a* arranged in the arrow C direction. On the front surface 30*a* of the first metal separator plate 30, an outlet buffer 50B is disposed between the oxygen-containing gas discharge passage 34*b* and the oxygen-containing gas flow field 48. The outlet buffer 50B has a plurality of emboss rows. Each emboss row includes a plurality of embossed portions 50*b* arranged in the arrow C direction.

The back surface 30*b* of the first metal separator plate 30 has an emboss row composed of a plurality of embossed portions 67*a* arranged in the arrow C direction, between the emboss rows of the inlet buffer 50A. The back surface 30*b* of the first metal separator plate 30 has an emboss row composed of a plurality of embossed portions 67*b* arranged in the arrow C direction, between the emboss rows of the outlet buffer 50B. The embossed portions 67*a* and 67*b* constitute respective buffers on the back surface 30*b* of the first metal separator plate 30.

A first bead 72A including a sealing bead 51 is formed on the front surface 30*a* of the first metal separator plate 30 so as to protrude toward the resin film equipped MEA 28 (FIG. 2), by press-forming. As shown in FIG. 3, resin material 56 is fixed and attached to protruding front surfaces of the sealing bead 51 by printing, coating, etc. For example, polyester fiber is used as the resin material 56. The resin material 56 may be provided on the resin film 46. The resin material 56 is not essential. The resin material 56 may be dispensed with.

As shown in FIG. 4, the sealing bead 51 includes an inner bead portion 51*a*, an outer bead portion 52, and a plurality of passage bead portions 53. The inner bead portion 51*a* is a bead seal that surrounds the oxygen-containing gas flow field 48, the inlet buffer 50A, and the outlet buffer 50B. The outer bead portion 52 is provided outside the inner bead portion 51*a*. The outer bead portion 52 is a bead seal that extends along the outer periphery of the first metal separator plate 30. The plurality of passage bead portions 53 are a plurality of bead seals that surround the oxygen-containing gas supply passage 34*a*, the oxygen-containing gas discharge passage 34*b*, the fuel gas supply passage 38*a*, the fuel gas discharge passage 38*b*, the coolant supply passage 36*a*, and the coolant discharge passage 36*b*, respectively. Each of the inner bead portion 51*a*, the outer bead portion 52, and the plurality of passage bead portions 53 protrudes from the front surface 30*a* of the first metal separator plate 30 toward the resin film equipped MEA 28.

Hereinafter, among the plurality of passage bead portions 53, a passage bead portion that surrounds the oxygen-containing gas supply passage 34*a* will be referred to as the "passage bead portions 53*a*", and a passage bead portion that surrounds the oxygen-containing gas discharge passage 34*b* will be referred to as the "passage bead portion 53*b*". The first metal separator plate 30 has bridge sections 80, 82 connecting the inside and the outside of the passage bead portions 53*a*, 53*b*.

The bridge section 80 is provided at a side part of the passage bead portion 53*a* that is located between the oxygen-containing gas supply passage 34*a* and the oxygen-containing gas flow field 48. The bridge section 80 includes a flow path for supplying the oxygen-containing gas introduced from the oxygen-containing gas supply passage 34*a* to the oxygen-containing gas flow field 48. The bridge section 82 is provided at a side part of the passage bead portion 53*b* that is located between the oxygen-containing gas discharge passage 34*b* and the oxygen-containing gas flow field 48. The bridge section 82 includes a flow path for discharging the oxygen-containing gas introduced from the oxygen-containing gas flow field 48 to the oxygen-containing gas discharge passage 34*b*.

As shown in FIG. 3, the second metal separator plate 32 has a front surface 32*a* as a first surface and a back surface 32*b* as a second surface. The front surface 32*a* faces toward the resin film equipped MEA 28. The back surface 32*b* faces toward the first metal separator plate 30.

Figure 5:
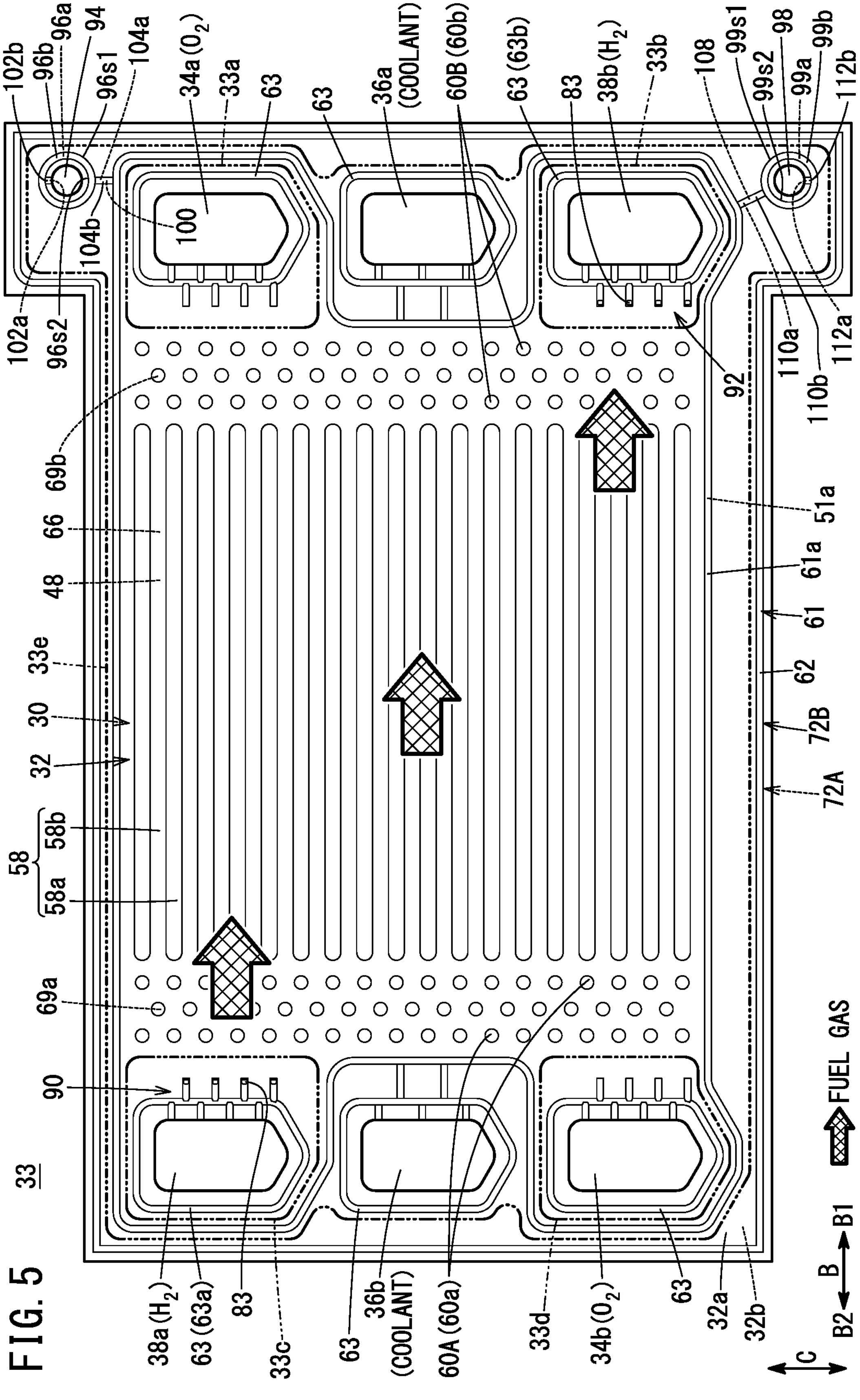
FIG. 5 is an explanatory front view of the fuel cell separator as viewed from a second metal separator plate side.

As shown in FIG. 5, a fuel gas flow field 58 (reactant gas flow field) extending in the direction indicated by the arrow B, for example, is provided on the front surface 32*a* of the second metal separator plate 32. The fuel gas flow field 58 communicates with the fuel gas supply passage 38*a* and the fuel gas discharge passage 38*b*. The fuel gas flow field 58 supplies fuel gas to the anode 42 (FIG. 2). The fuel gas flow field 58 includes straight flow grooves 58*b* between a plurality of ridges 58*a*. Each ridge 58*a* extends in the arrow B direction. The fuel gas flow field 58 may have a plurality of wavy flow grooves instead of the plurality of straight flow grooves 58*b*.

On the front surface 32*a* of the second metal separator plate 32, an inlet buffer 60A is disposed between the fuel gas supply passage 38*a* and the fuel gas flow field 58. The inlet buffer 60A has a plurality of emboss rows. Each emboss row includes a plurality of embossed portions 60*a* arranged in the arrow C direction. On the front surface 32*a* of the second metal separator plate 32, an outlet buffer 60B is disposed between the fuel gas discharge passage 38*b* and the fuel gas flow field 58. The outlet buffer 60B has a plurality of emboss rows. Each emboss row includes a plurality of embossed portions 60*b* arranged in the arrow C direction.

The back surface 32*b* of the second metal separator plate 32 has an emboss row composed of a plurality of embossed portions 69*a* arranged in the arrow C direction, between the emboss rows of the inlet buffer 60A. The back surface 32*b* of the second metal separator plate 32 has an emboss row composed of a plurality of embossed portions 69*b* arranged in the arrow C direction, between the emboss rows of the outlet buffer 60B. The embossed portions 69*a* and 69*b* constitute respective buffers of the back surface 32*b* of the second metal separator plate 32.

A second bead 72B including a sealing bead 61 is formed on the front surface 32*a* of the second metal separator plate 32 so as to protrude toward the resin film equipped MEA 28, by press-forming. As shown in FIG. 3, resin material 56 is fixed and attached to protruding front surfaces of the sealing bead 61 by printing, coating, etc. For example, polyester fiber is used as the resin material 56. The resin material 56 may be provided on the resin film 46. The resin material 56 is not essential. The resin material 56 may be dispensed with.

As shown in FIG. 5, the sealing bead 61 includes an inner bead portion 61*a*, an outer bead portion 62, and a plurality of passage bead portions 63. The inner bead portion 61*a* is a bead seal that surrounds the fuel gas flow field 58, the inlet buffer 60A, and the outlet buffer 60B. The outer bead portion 62 is provided outside the inner bead portion 61*a*. The outer bead portion 62 is a bead seal that extends along the outer periphery of the second metal separator plate 32. The plurality of passage bead portions 63 are a plurality of bead seals that surround the oxygen-containing gas supply passage 34*a*, the oxygen-containing gas discharge passage 34*b*, the fuel gas supply passage 38*a*, the fuel gas discharge passage 38*b*, the coolant supply passage 36*a*, and the coolant discharge passage 36*b*, respectively. Each of the inner bead portion 61*a*, the outer bead portion 62, and the plurality of passage bead portions 63 protrudes from the front surface 32*a* of the second metal separator plate 32 toward the resin film equipped MEA 28.

Hereinafter, among the plurality of the passage bead portions 63, a bead portion that surrounds the fuel gas supply passage 38*a* is referred to as a "passage bead portion 63*a*", and a bead portion that surrounds the fuel gas discharge passage 38*b* is referred to as a "passage bead portion 63*b*". The second metal separator plate 32 has bridge sections 90, 92 connecting the inside and the outside of the passage bead portions 63*a*, 63*b*.

The bridge section 90 is provided at a side part of the passage bead portion 63*a* that is located between the fuel gas supply passage 38*a* and the fuel gas flow field 58. The bridge section 90 includes a flow path for supplying the fuel gas introduced from the fuel gas supply passage 38*a* to the fuel gas flow field 58. The bridge section 92 is provided at a side part of the passage bead portion 63*b* that is located between the fuel gas discharge passage 38*b* and the fuel gas flow field 58. The bridge section 92 includes a flow path for discharging the fuel gas introduced from the fuel gas flow field 58 to the fuel gas discharge passage 38*b*.

As shown in FIG. 2, a coolant flow field 66 communicating with the coolant supply passage 36*a* and the coolant discharge passage 36*b* is formed between the back surface 30*b* of the first metal separator plate 30 and the back surface 32*b* of the second metal separator plate 32 that are joined together. The coolant flow field 66 is formed by overlapping the back surface shape of the oxygen-containing gas flow field 48 of the first metal separator plate 30 and the back surface shape of the fuel gas flow field 58 of the second metal separator plate 32.

As shown in FIGS. 4 and 5, the first metal separator plate 30 and the second metal separator plate 32 of the fuel cell separator 33 are joined together by laser welding lines 33*a* to 33*e*. The laser welding line 33*a* is formed around the oxygen-containing gas supply passage 34*a* and the bridge section 80. The laser welding line 33*b* is formed around the fuel gas discharge passage 38*b* and the bridge section 92.

The laser welding line 33*c* is formed around the fuel gas supply passage 38*a* and the bridge section 90. The laser welding line 33*d* is formed around the oxygen-containing gas discharge passage 34*b* and the bridge section 82. The laser welding line 33*e* is formed around the oxygen-containing gas flow field 48, the fuel gas flow field 58, the coolant flow field 66, the oxygen-containing gas supply passage 34*a*, the oxygen-containing gas discharge passage 34*b*, the fuel gas supply passage 38*a*, the fuel gas discharge passage 38*b*, the coolant supply passage 36*a*, the coolant discharge passage 36*b*, and an air vent passage 94 and a coolant drain passage 98 described later, and along the outer periphery of the fuel cell separator 33. The laser welding line 33*e* is located between the inner bead portions 51*a*, 61*a* and the outer bead portions 52, 62. The first metal separator plate 30 and the second metal separator plate 32 may be joined together by brazing, instead of welding such as laser welding.

As shown in FIG. 2, the air vent passage 94 and the coolant drain passage 98 extend through the first metal separator plate 30, the second metal separator plate 32, and the resin film equipped MEA 28 (resin film 46) in the separator thickness direction (stacking direction). The air vent passage 94 is a hole for releasing air in the coolant. The air vent passage 94 is provided at an upper corner of the power generation cell 12 on one end side in the horizontal direction (the side in the direction indicated by the arrow B1). The coolant drain passage 98 is provided at a lower corner of the power generation cell 12 on one end side in the horizontal direction (the side in the direction of arrow B1). It should be noted that one of the air vent passage 94 and the coolant drain passage 98 may be provided at one end side of the power generation cell 12 in the horizontal direction, and the other of the air vent passage 94 and the coolant drain passage 98 may be provided at the other end side of the power generation cell 12 in the horizontal direction.

As shown in FIGS. 4 and 5, the air vent passage 94 is provided above the uppermost portions of the inner bead portions 51*a* and 61*a*. The air vent passage 94 is provided above the passage 34*a* provided at the uppermost position among the plurality of passages 34*a*, 36*a*, 38*b* which are arranged vertically (up-down direction). In the embodiment of the present invention, the air vent passage 94 has a circular shape. The air vent passage 94 may have an ellipse shape (not limited to the geometrically perfect ellipse shape, but including a substantially ellipse shape), an oval shape, or a polygonal shape.

As shown in FIG. 4, on the front surface 30*a* of the first metal separator plate 30, a passage sealing bead 96*a* surrounding the air vent passage 94 is formed so as to protrude toward the resin film 46 (FIG. 2), by press forming. As shown in FIG. 5, on the front surface 32*a* of the second metal separator plate 32, a passage sealing bead 96*b* surrounding the air vent passage 94 is formed so as to protrude toward the resin film 46 (FIG. 2), by press forming.

Figure 6:
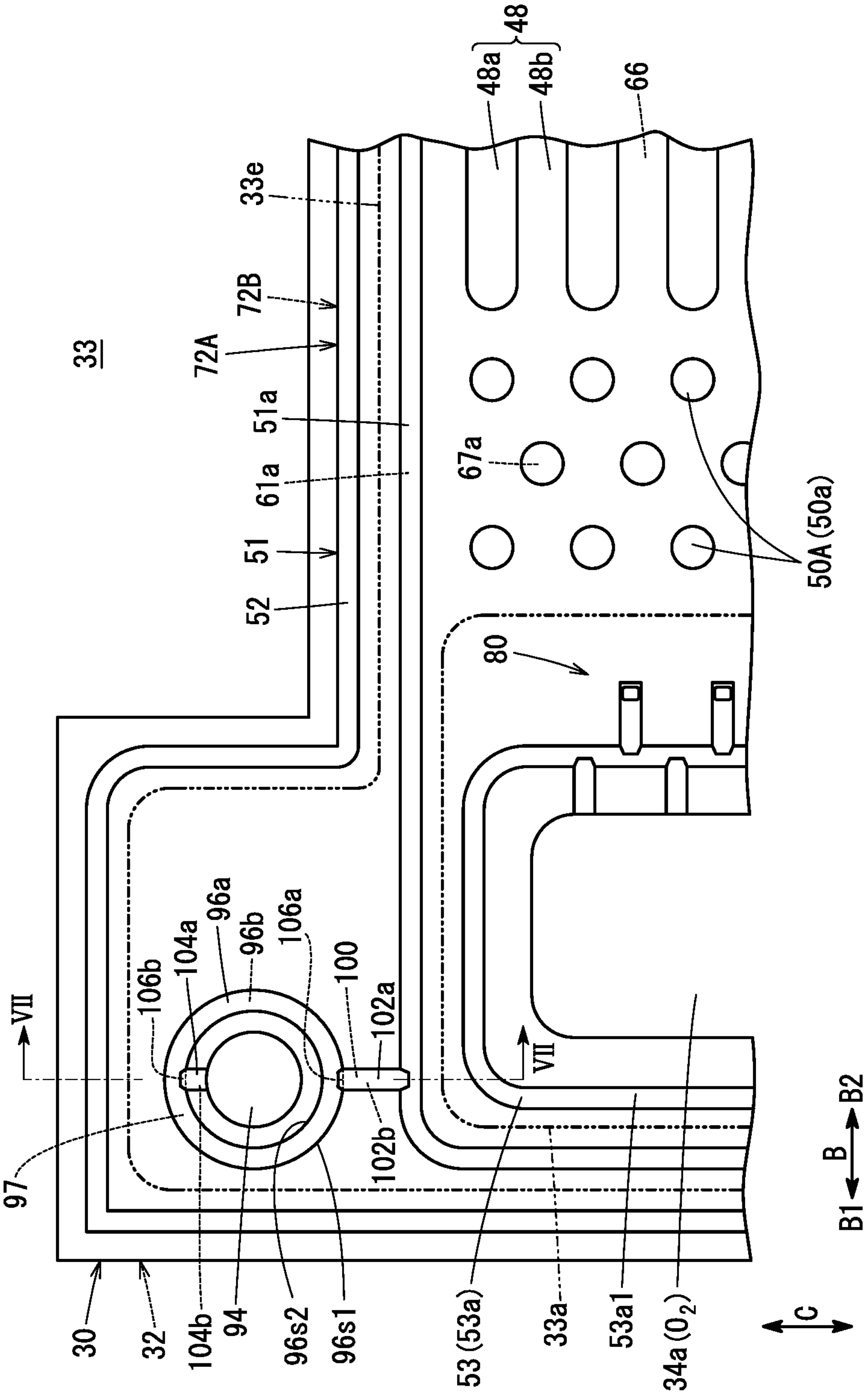
FIG. 6 is a diagram illustrating a configuration of an air vent passage of the fuel cell separator and its periphery.
Figure 7:
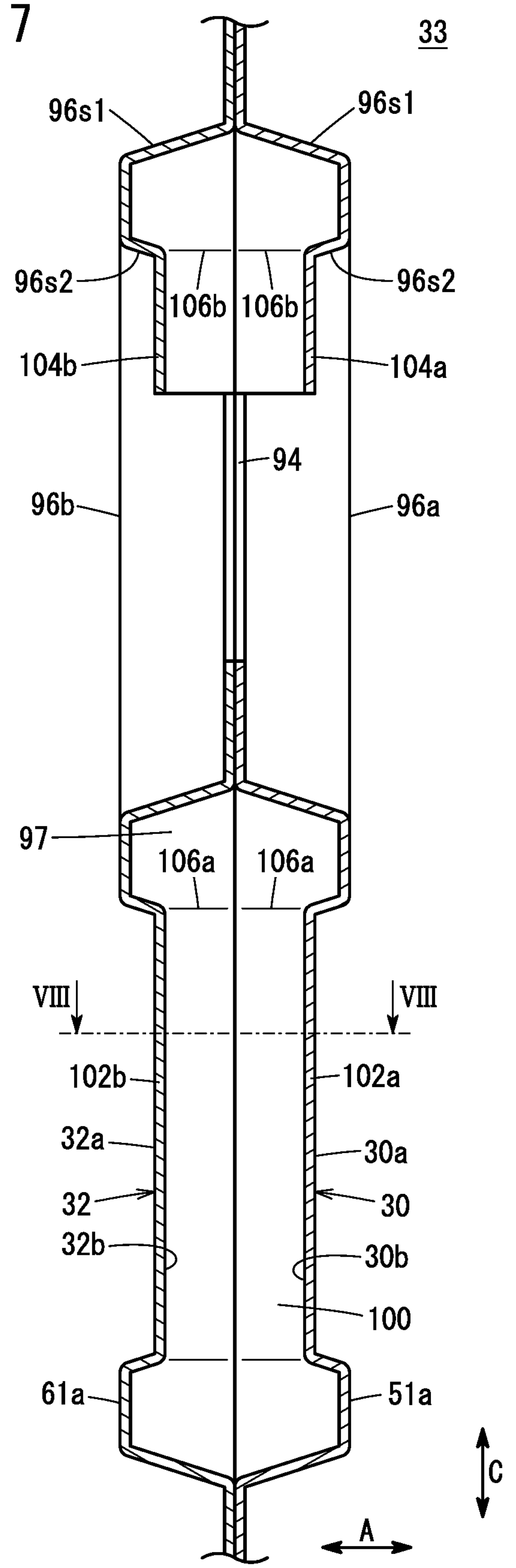
FIG. 7 is a cross-sectional view taken along line VII-VII of FIG. 6.

As shown in FIGS. 6 and 7, each of the passage sealing beads 96*a*, 96*b* includes an outer peripheral wall 96*s*1 and an inner peripheral wall 96*s*2 extending in pairs, and a first internal channel 97 formed between the outer peripheral wall 96*s*1 and the inner peripheral wall 96*s*2 and extending so as to surround the air vent passage 94. The outer peripheral wall 96*s*1 faces in a direction opposite to the direction toward the air vent passage 94. The inner peripheral wall 96*s*2 faces toward the air vent passage 94. The passage sealing beads 96*a*, 96*b* have a circular shape in planar view (see FIG. 6).

As shown in FIG. 7, in the present embodiment, the inner peripheral walls 96*s*2 and the outer peripheral walls 96*s*1 of the passage sealing beads 96*a*, 96*b* are inclined from the separator thickness direction (lower connection beads 110*a*, 110*b*, which will be described later, are also inclined from the separator thickness direction). Therefore, each of the passage sealing beads 96*a*, 96*b* has a trapezoidal shape in cross section taken along the separator thickness direction. The inner peripheral walls 96*s*2 and the outer peripheral walls 96*s*1 of the passage sealing beads 96*a*, 96*b* may be in parallel with the separator thickness direction. That is, the passage sealing beads 96*a*, 96*b* may have a rectangular shape in cross section taken along the separator thickness direction.

As shown in FIGS. 6 and 7, the air vent passage 94 communicates with the coolant flow field 66 via a first connection channel 100 (connection channel). The first connection channel 100 allows the first internal channel 97 (recesses on the back of the passage sealing beads 96*a*, 96*b*) and the internal space (recesses on the back) of the inner bead portion 51*a*, 61*a* to communicate with each other.

Specifically, the first bead 72A and the second bead 72B include upper connection beads 102*a*, 102*b*, and the first connection channel 100 is formed inside the upper connection beads 102*a*, 102*b*. One end of each of the upper connection beads 102*a*, 102*b* is connected to the uppermost portion of the corresponding one of the inner bead portions 51*a*, 61*a*. The other end of each of the upper connection beads 102*a* and 102*b* is connected to the outer peripheral wall 96*s*1 of the corresponding one of the passage sealing beads 96*a* and 96*b*.

In FIG. 6, the upper connection beads 102*a*, 102*b* extend so as to follow the shortest route from the inner bead portions 51*a*, 61*a* to the passage sealing beads 96*a*, 96*b*. The upper connection beads 102*a*, 102*b* extend straight over the entire length. The upper connection beads 102*a* and 102*b* extend downward from the lower end portions of the passage sealing beads 96*a* and 96*b*.

Figure 8:
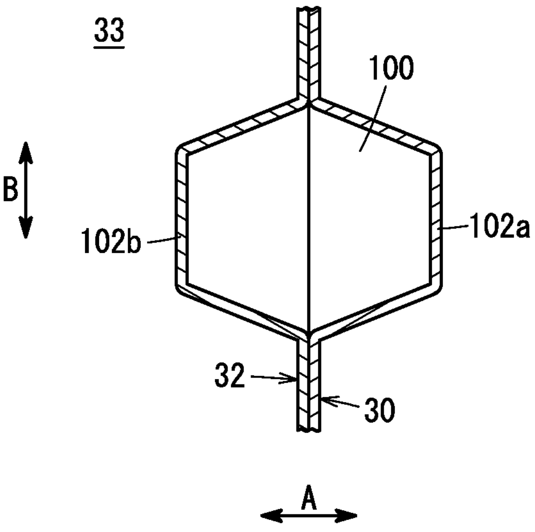
FIG. 8 is a cross-sectional view taken along line VIII-VIII of FIG. 7.

As shown in FIGS. 7 and 8, the first connection channel 100 is formed by the back side of the upper connection bead 102*a* in the first metal separator plate 30 and the back side of the upper connection bead 102*b* in the second metal separator plate 32. As in the case of the passage sealing beads 96*a*, 96*b*, the upper connection beads 102*a*, 102*b* have a trapezoidal shape in cross section taken along the separator thickness direction. The upper connection beads 102*a*, 102*b* may have a rectangular shape in cross section taken along the separator thickness direction.

As shown in FIGS. 6 and 7, tunnels 104*a*, 104*b* are provided in the first metal separator plate 30 and the second metal separator plate 32, respectively. The tunnels 104*a*, 104*b* protrude from the inner peripheral walls 96*s*2 of the passage sealing beads 96*a*, 96*b* toward the air vent passage 94. The tunnels 104*a*, 104*b* extend downward from the upper end portions of the passage sealing beads 96*a*, 96*b*. The coolant flow field 66 and the air vent passage 94 are connected to each other through the internal spaces of the inner bead portions 51*a*, 61*a*, the internal spaces (first connection channel 100) of the upper connection beads 102*a*, 102*b*, the first internal channel 97 of the passage sealing beads 96*a*, 96*b*, and the internal spaces of the tunnels 104*a*, 104*b*. The fuel cell separator 33 may include only one of the upper connection bead 102*a* and the upper connection bead 102*b*. The fuel cell separator 33 may have only one of the tunnel 104*a* and the tunnel 104*b*.

In order to prevent bypassing of the reactant gas (bypassing of the reactant gas in the direction indicated by the arrow B) at ends of the reactant gas flow field in the flow field width direction, bypass prevention ridges may be formed on the fuel cell separator 33, by press forming, to protrude toward the resin film 46 and protrude from the inner bead portions 51*a*, 61*a* toward the oxygen-containing gas flow field 48 and the fuel gas flow field 58, respectively. A plurality of the bypass prevention ridges may be provided at intervals in the flow field length direction (indicated by the arrow B) of the reactant gas flow field. In this case, the recesses corresponding to the back of the bypass prevention ridges form part of a channel connecting the coolant flow field 66 and the air vent passage 94.

In FIGS. 6 and 7, a first communication hole 106*a* is provided in the outer peripheral wall 96*s*1 of each of the passage sealing beads 96*a* and 96*b*. The first communication hole 106*a* allows the first connection channel 100 and the first internal channel 97 of the passage sealing beads 96*a* and 96*b* to communicate with each other. A second communication hole 106*b* is provided in the inner peripheral wall 96*s*2 of each of the passage sealing beads 96*a* and 96*b*. The second communication hole 106*b* allows the first internal channel 97 of the passage sealing beads 96*a* and 96*b* to communicate with the internal space of the tunnels 104*a* and 104*b*. That is, the second communication hole 106*b* communicates with the air vent passage 94 via the internal space of the tunnel 104*a* and the 104*b*.

The first communication hole 106*a* and the second communication hole 106*b* are displaced from each other in the extending direction of the first internal channel 97 of the passage sealing beads 96*a*, 96*b*. More specifically, the first communication hole 106*a* is located below the air vent passage 94. The first communication hole 106*a* is oriented in the vertical direction. The second communication hole 106*b* is located above the air vent passage 94. The second communication hole 106*b* is oriented in the vertical direction. The first communication hole 106*a* and the second communication hole 106*b* are displaced from each other by 180 degrees in the extending direction of the passage sealing beads 96*a*, 96*b*. The first communication hole 106*a* and the second communication hole 106*b* do not directly face each other. The first communication hole 106*a* is located at the lowermost portion of the outer peripheral wall 96*s*1. The second communication hole 106*b* is located at the uppermost portion of the inner peripheral wall 96*s*2. The second communication hole 106*b* is located above the first communication hole 106*a*.

The positions of the first communication hole 106*a* and the second communication hole 106*b* can be appropriately set as long as they do not directly face each other. That is, for example, the first communication hole 106*a* and the second communication hole 106*b* may be positioned so as to be displaced from each other by 90 degrees in the extending direction of the passage sealing beads 96*a* and 96*b*.

The protruding ends of the tunnel 104*a* and 104*b* open at the air vent passage 94. As long as the second communication hole 106*b* is provided in the inner peripheral wall 96*s*2, the fuel cell separator 33 may not be provided with the tunnels 104*a* and the 104*b*.

The protruding heights of the upper connection beads 102*a*, 102*b* and the tunnels 104*a*, 104*b* are lower than the protruding heights of the passage sealing beads 96*a*, 96*b* (the same applies to the lower connection beads 110*a*, 110*b* and the tunnels 112*a*, 112*b* to be described later).

As shown in FIGS. 4 and 5, the coolant drain passage 98 is provided below the lowermost portions of the inner bead portions 51*a*, 61*a*. The coolant drain passage 98 is provided below the passage 38*b* disposed at the lowermost position among the plurality of the passages 34*a*, 36*a*, 38*b* arranged in the vertical direction. The coolant drain passage 98 has a circular shape. The coolant drain passage 98 may have an ellipse shape (not limited to the geometrically perfect ellipse shape, but including a substantially ellipse shape), an oval shape, or a polygonal shape.

As shown in FIG. 4, a passage sealing bead 99*a* surrounding the coolant drain passage 98 is formed on the front surface 30*a* of the first metal separator plate 30 so as to protrude toward the resin film 46 (FIG. 2), by press forming. As shown in FIG. 5, a passage sealing bead 99*b* surrounding the coolant drain passage 98 is formed on the front surface 32*a* of the second metal separator plate 32 so as to protrude toward the resin film 46 (FIG. 2), by press forming.

Figure 9:
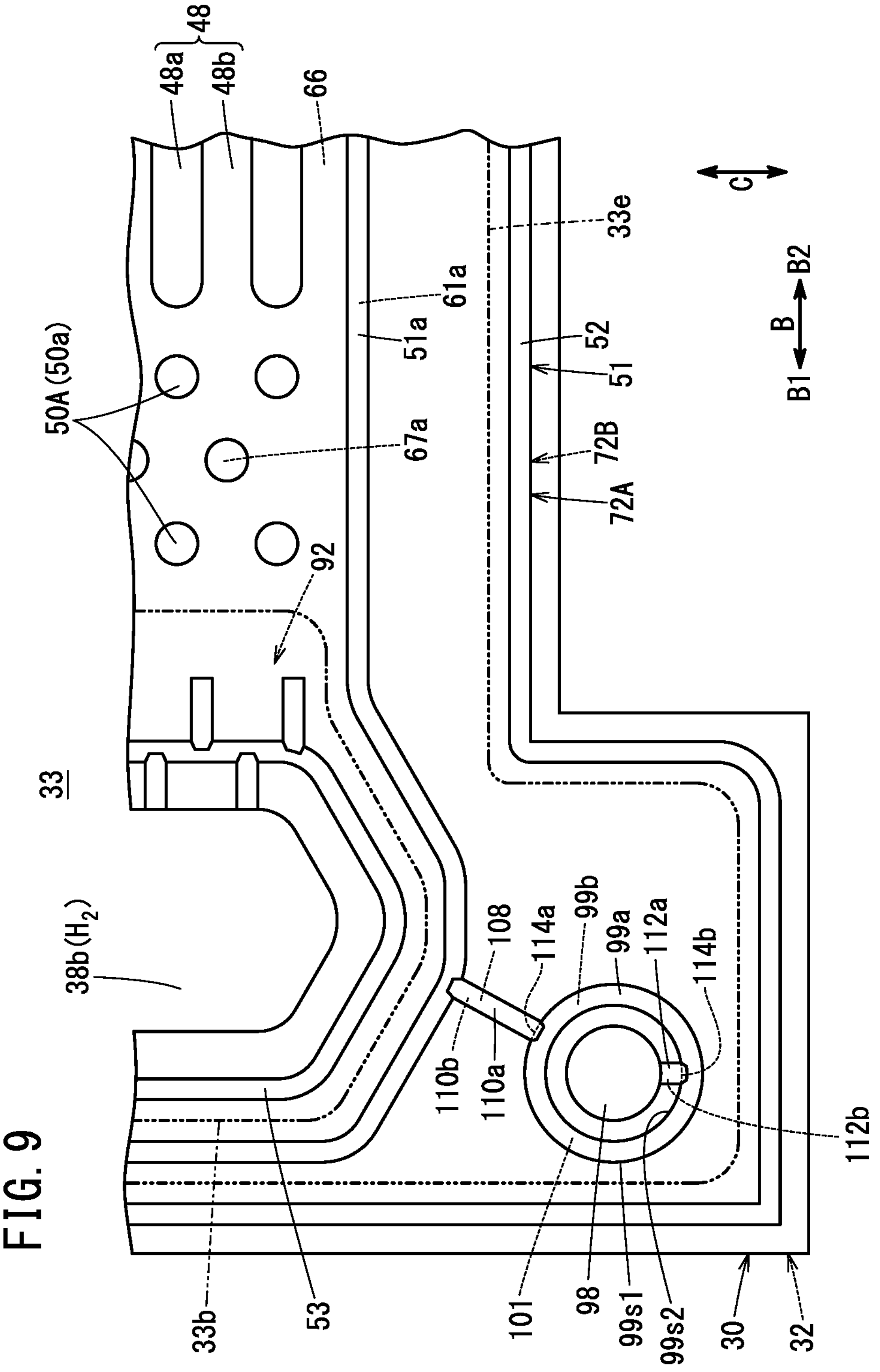
FIG. 9 is a configuration explanatory view of a coolant drain passage of the fuel cell separator and its periphery.

As shown in FIG. 9, each of the passage sealing beads 99*a*, 99*b* includes an outer peripheral wall 99*s*1 and an inner peripheral wall 99*s*2 that extend in pairs, and a second internal channel 101 that is formed between the outer peripheral wall 99*s*1 and the inner peripheral wall 99*s*2 and that extends so as to surround the coolant drain passage 98. The outer peripheral wall 99*s*1 faces in a direction opposite to the direction toward the coolant drain passage 98. The inner peripheral wall 99*s*2 faces toward the coolant drain passage 98. The passage sealing beads 99*a*, 99*b* have a circular shape in planar view. The passage sealing beads 99*a*, 99*b* have the same structure as the passage sealing beads 96*a*, 96*b* described above.

The coolant drain passage 98 is in communication with the coolant flow field 66 via a second connection channel 108 (connection channel). The second connection channel 108 allows the second internal channel 101 (recesses on the back of the passage sealing beads 99*a*, 99*b*) and the internal space (recesses on the back) of the inner bead portion 51*a*, 61*a* to communicate with each other.

Specifically, the first bead 72A and the second bead 72B include lower connection beads 110*a*, 110*b*, and the second connection channel 108 is formed inside the lower connection beads 110*a*, 110*b*. One end of each of the lower connection beads 110*a*, 110*b* is connected to the lowermost portion of the corresponding one of the inner bead portions 51*a*, 61*a*. The lowermost portions of the inner bead portions 51*a*, 61*a* are provided immediately below the passage 38*b* that is located at the lowermost position, among the plurality of passages 34*a*, 36*a*, 38*b* which are arranged vertically. The other end of each of the lower connection beads 110*a* and 110*b* is connected to the outer peripheral wall 99*s*1 of the corresponding one of the passage sealing beads 99*a* and 99*b*.

The lower connection beads 110*a*, 110*b* extend so as to follow the shortest route from the inner bead portions 51*a*, 61*a* to the passage sealing beads 99*a*, 99*b*. The lower connection beads 110*a*, 110*b* extend straight over the entire length. The lower connection beads 110*a* and 110*b* extend obliquely from the lowermost portions of the inner bead portions 51*a* and 61*a* toward the upper end portions of the passage sealing beads 99*a* and 99*b* so as to be inclined from the vertical direction.

The second connection channel 108 is formed by the back side of the lower connection bead 110*a* in the first metal separator plate 30 and the back side of the lower connection bead 110*b* in the second metal separator plate 32. The lower connection beads 110*a* and 110*b* have the same structure as the upper connection beads 102*a* and 102*b* described above.

The first metal separator plate 30 and the second metal separator plate 32 are provided with tunnels 112*a*, 112*b*, respectively. The tunnels 112*a*, 112*b* protrude from the inner peripheral walls 99*s*2 of the passage sealing beads 99*a*, 99*b* toward the coolant drain passage 98. The coolant flow field 66 and the coolant drain passage 98 are connected to each other through the internal spaces of the inner bead portions 51*a*, 61*a*, the internal spaces (second connection channel 108) of the lower connection beads 110*a*, 110*b*, the second internal channel 101 of the passage sealing beads 99*a*, 99*b*, and the internal spaces of the tunnels 112*a*, 112*b*. The fuel cell separator 33 may include only one of the lower connection bead 110*a* and the lower connection bead 110*b*. The fuel cell separator 33 may have only one of the tunnel 112*a* and the tunnel 112*b*.

A first communication hole 114*a* is provided in the outer peripheral wall 99*s*1 of each of the passage sealing beads 99*a* and 99*b*. The first communication hole 114*a* allows the second connection channel 108 and the second internal channel 101 of the passage sealing beads 99*a* and 99*b* to communicate with each other. A second communication hole 114*b* is provided in the inner peripheral wall 99*s*2 of each of the passage sealing beads 99*a* and 99*b*. The second communication hole 114*b* allows the internal space of the passage sealing beads 99*a* and 99*b* to communicate with the internal space of the tunnels 112*a* and 112*b*. That is, the second communication hole 114*b* communicates with the coolant drain passage 98 via the internal spaces of the tunnel 112*a* and the 112*b*.

The first communication hole 114*a* and the second communication hole 114*b* are displaced from each other in the extending direction of the passage sealing beads 99*a*, 99*b*. More specifically, the first communication hole 114*a* is located above the coolant drain passage 98. The first communication hole 114*a* faces upward in manner of being inclined with respect to the up-down direction (vertical direction). The second communication hole 114*b* is located below the coolant drain passage 98. The second communication hole 114*b* is oriented in the up-down direction. The first communication hole 114*a* and the second communication hole 114*b* are displaced from each other by 90 degrees or more in the extending direction of the passage sealing beads 99*a*, 99*b*. The first communication hole 114*a* and the second communication hole 114*b* do not directly face each other. The first communication hole 114*a* is located above the vertical center of the outer peripheral wall 99*s*1. The second communication hole 114*b* is located at the lowermost portion of the inner peripheral wall 99*s*2. The second communication hole 114*b* is located below the first communication hole 114*a*. The positions of the first communication hole 114*a* and the second communication hole 114*b* can be appropriately set as long as they do not directly face each other.

The protruding ends of the tunnel 112*a* and 112*b* open at the coolant drain passage 98. As long as the second communication hole 114*b* is provided in the inner peripheral wall 99*s*2, the fuel cell separator 33 may not be provided with the tunnels 112*a* and the 112*b*.

The fuel cell stack 10 configured as described above operates as follows.

First, as shown in FIG. 1, an oxygen-containing gas is supplied to the oxygen-containing gas supply passage 34*a* of the end plate 20*a*. A fuel gas is supplied to the fuel gas supply passage 38*a* of the end plate 20*a*. A coolant is supplied to the coolant supply passage 36*a* of the end plate 20*a*.

As shown in FIG. 2, the oxygen-containing gas flows from the oxygen-containing gas supply passage 34*a* into the oxygen-containing gas flow field 48 of the first metal separator plate 30 through the bridge section 80 (see FIG. 4). Then, the oxygen-containing gas flows along the oxygen-containing gas flow field 48 in the direction indicated by the arrow B, and the oxygen-containing gas is supplied to the cathode 44 of the membrane electrode assembly 28*a*.

In the meanwhile, the fuel gas flows from the fuel gas supply passage 38*a* into the fuel gas flow field 58 of the second metal separator plate 32 through the bridge section 90. The fuel gas moves along the fuel gas flow field 58 in the direction indicated by the arrow B, and the fuel gas is supplied to the anode 42 of the membrane electrode assembly 28*a*.

Thus, in each of the membrane electrode assemblies 28*a*, the oxygen-containing gas supplied to the cathode 44 and the fuel gas supplied to the anode 42 are consumed in electrochemical reactions in the first electrode catalyst layer 44*a* and the second electrode catalyst layer 42*a*. As a result, power generation is performed.

Then, the oxygen-containing gas supplied to and consumed at the cathode 44 flows from the oxygen-containing gas flow field 48 to the oxygen-containing gas discharge passage 34*b* through the bridge section 82 (FIG. 4). After having flowed into the oxygen-containing gas discharge passage 34*b*, the oxygen-containing gas is discharged along the oxygen-containing gas discharge passage 34*b* in the direction of arrow A. Similarly, the fuel gas supplied to and consumed by the anode 42 flows from the fuel gas flow field 58 to the fuel gas discharge passage 38*b* through the bridge section 92. After having flowed into the fuel gas discharge passage 38*b*, the fuel gas is discharged along the fuel gas discharge passage 38*b* in the direction of arrow A.

Further, the coolant supplied to the coolant supply passage 36*a* flows into the coolant flow field 66 between the first metal separator plate 30 and the second metal separator plate 32. The coolant flows in the direction of arrow B after being introduced into the coolant flow field 66. After the coolant cools the membrane electrode assembly 28*a*, the coolant is discharged from the coolant discharge passage 36*b*.

The present embodiment has the following effects.

In the fuel cell separator 33 of the fuel cell stack 10, the air vent passage 94 is connected to the coolant flow field 66 through the first connection channel 100 formed by the recesses on the back of the protruding shape of the first bead 72A and the second bead 72B. Further, the coolant drain passage 98 is connected to the coolant flow field 66 through the second connection channel 108 formed by the recesses on the back of the protruding shape of the first bead 72A and the second bead 72B. In the structure, the recesses on the back of the beads provided in the first metal separator plate 30 and the second metal separator plate 32 are utilized effectively, and it is possible to achieve a simple coolant flow field structure.

Figure 10:
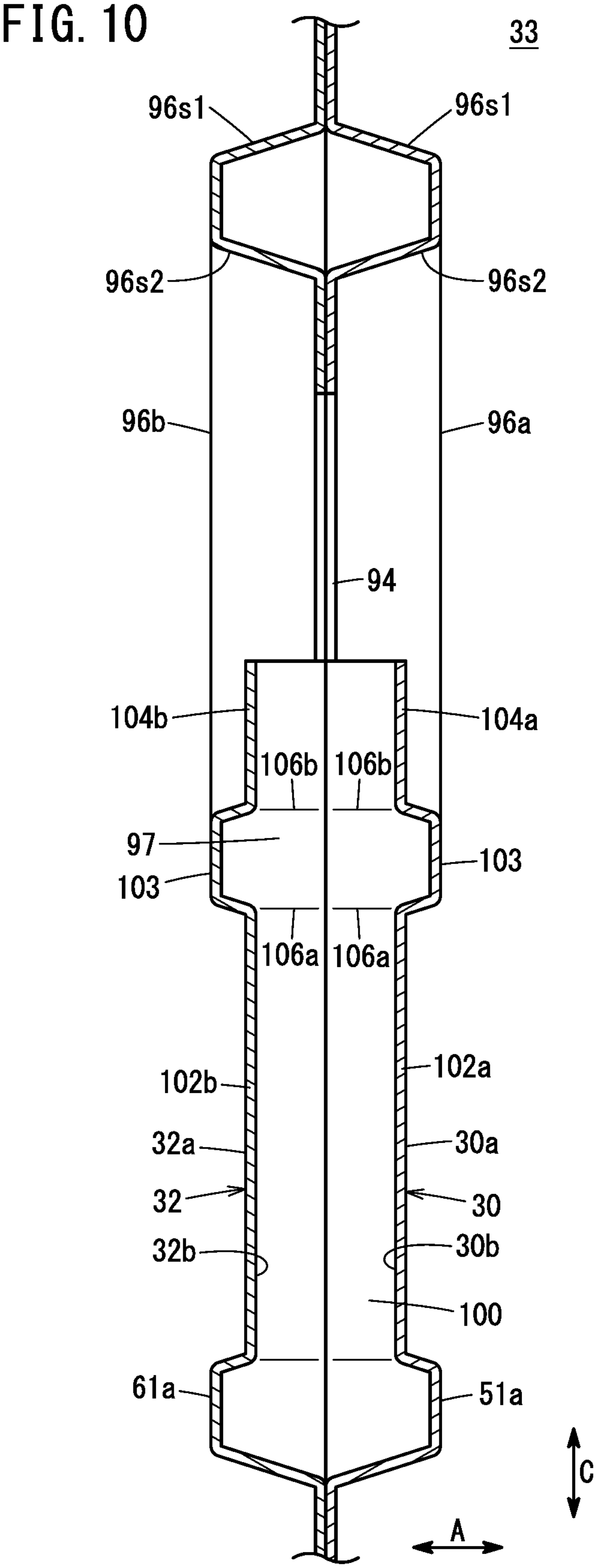
FIG. 10 is a partially omitted cross-sectional view of a fuel cell separator according to a comparative example.

As shown in FIG. 10, in the case where the first communication hole 106*a* and the second communication hole 106*b* directly face each other, when a compressive load in the stacking direction is applied to the fuel cell stack 10, a reaction force is less likely to be generated in portions 103 of the protruding end surfaces of the passage sealing beads 96*a* and 96*b* that are adjacent to the first communication hole 106*a* and the second communication hole 106*b*.

In contrast, as shown in FIG. 7, in the fuel cell separator 33 according to the present embodiment, the first communication hole 106*a* and the second communication hole 106*b* are displaced from each other in the extending direction of the first internal channel 97 surrounding the air vent passage 94. Therefore, when a compressive load in the stacking direction is applied to the fuel cell stack 10, it is possible to prevent the reaction force from becoming excessively small at the portion adjacent to the first communication hole 106*a* and the portion adjacent to the second communication hole 106*b*, of the protruding end surfaces of the passage sealing beads 96*a* and 96*b*. Therefore, it is possible to satisfactorily achieve sealing over the entire circumference of each of the passage sealing beads 96*a* and 96*b*.

In the fuel cell separator 33, the first communication hole 114*a* and the second communication hole 114*b* are displaced from each other in the extending direction of the second internal channel 101 surrounding the coolant drain passage 98. Therefore, when a compressive load in the stacking direction is applied to the fuel cell stack 10, the reaction force generated at the portion adjacent to the first communication hole 114*a* and the portion adjacent to the second communication hole 114*b*, of the protruding end surfaces of the passage sealing beads 99*a* and 99*b* can be prevented from becoming excessively small. Therefore, it is possible to satisfactorily achieve sealing over the entire circumference of each of the passage sealing beads 99*a* and 99*b*.

The fuel cell separator 33 is provided with the tunnels 104*a*, 104*b* each extending from the inner peripheral wall 96*s*2 toward the air vent passage 94. The internal space of the tunnel 104*a*, 104*b* communicates with the first internal channel 97 of the passage sealing bead 96*a*, 96*b* via the second communication hole 106*b*.

According to such a configuration, the air guided from the coolant flow field 66 to the first internal channel 97 of the passage sealing beads 96*a*, 96*b* can be efficiently discharged to the air vent passage 94 via the internal spaces of the tunnels 104*a*, 104*b*.

The fuel cell separator 33 is provided with the tunnels 112*a*, 112*b* each extending from the inner peripheral wall 99*s*2 toward the coolant drain passage 98. The internal space of the tunnel 112*a*, 112*b* communicates with the second internal channel 101 of the passage sealing bead 99*a*, 99*b* via the second communication hole 114*b*.

According to such a configuration, when the coolant is removed from the coolant flow field 66 during maintenance work or the like of the fuel cell stack 10, the coolant guided from the coolant flow field 66 to the second internal channel 101 of the passage sealing beads 99*a*, 99*b* can be efficiently discharged to the coolant drain passage 98 via the internal spaces of the tunnels 112*a*, 112*b*.

The second communication hole 106*b* is located above the center of the air vent passage 94 in an installed state where the fuel cell stack 10 incorporating the fuel cell separators 33 is installed.

According to such a configuration, it is possible to suppress accumulation of air in the upper portion of the first internal channel 97 of the passage sealing beads 96*a*, 96*b*. Therefore, the air in the coolant can be smoothly discharged to the air vent passage 94.

The second communication hole 106*b* is located at the uppermost portion of the inner peripheral wall 96*s*2 of the passage sealing beads 96*a*, 96*b* in the installed state of the fuel cell stack 10.

According to such a configuration, it is possible to further suppress accumulation of air in the upper portion of the first internal channel 97 of the passage sealing beads 96*a*, 96*b*. Therefore, the air in the coolant can be more smoothly discharged to the air vent passage 94.

The second communication hole 114*b* is located below the center of the coolant drain passage 98 in the installed state of the fuel cell stack 10.

According to such a configuration, the coolant can be efficiently discharged to the coolant drain passage 98 at the time of maintenance work or the like of the fuel cell stack 10.

The second communication hole 114*b* is located at the lowermost portion of the inner peripheral wall 99*s*2 of the passage sealing beads 99*a*, 99*b* in the installed state of the fuel cell stack 10.

According to such a configuration, the coolant can be more efficiently discharged to the coolant drain passage 98 at the time of maintenance work or the like of the fuel cell stack 10.

The present invention is not limited to the above-described embodiment, and various configurations can be adopted therein without departing from the essence and gist of the present invention.

The present embodiment discloses the following contents.

The above embodiments discloses the fuel cell separator (33) including the two metal separator plates (30, 32) joined to each other, each of the two metal separator plates including the first surface (30*a*, 32*a*) formed with the reactant gas flow field (48, 58) configured to flow a reactant gas which is a fuel gas or an oxygen-containing gas and the second surface (30*b*, 32*b*) formed with the coolant flow field (66) configured to flow a coolant, wherein the fuel cell separator includes the reactant gas passage (34*a*, 34*b*, 38*a*, 38*b*) that is formed so as to penetrate through the fuel cell separator in the separator thickness direction, the reactant gas passage communicating with the reactant gas flow field, and the bead (72A, 72B) is formed on the first surface so as to protrude therefrom, the bead including the sealing bead (51, 61) provided in order to prevent leakage of the reactant gas, wherein the fuel cell separator further includes at least one of the air vent passage (94) or the coolant drain passage (98) that is formed so as to penetrate through the fuel cell separator in the separator thickness direction, the second surface includes the connection channel (100, 108) formed by a recess forming the back of a protruding shape of the bead, at least one of the air vent passage or the coolant drain passage communicates with the coolant flow field via the connection channel, the sealing bead includes the passage sealing bead (96*a*, 96*b*, 99*a*, 99*b*) surrounding the air vent passage or the coolant drain passage, the passage sealing bead includes the outer peripheral wall (96*s*1, 99*s*1) and the inner peripheral wall (96*s*2, 99*s*2) that extend in pairs, and the internal channel (97, 101) that is formed between the outer peripheral wall and the inner peripheral wall and that extends so as to surround the air vent passage or the coolant drain passage, the outer peripheral wall includes the first communication hole (106*a*, 114*a*) configured to allow the internal channel of the passage sealing bead and the connection channel to communicate with each other, the inner peripheral wall includes the second communication hole (106*b*, 114*b*) configured to allow the internal channel of the passage sealing bead and the air vent passage or the coolant drain passage to communicate with each other, and the first communication hole and the second communication hole are displaced from each other in the extending direction of the internal channel.

The above fuel cell separator may further include the tunnel (104*a*, 104*b*, 112*a*, 112*b*) extending from the inner peripheral wall toward the air vent passage or the coolant drain passage, and the internal space of the tunnel may communicate with the internal channel via the second communication hole.

In the above fuel cell separator, the air vent passage may be formed so as to penetrate through each of the two metal separator plates, and the second communication hole provided in the passage sealing bead that surrounds the air vent passage may be located above the center of the air vent passage in the installed state in which the fuel cell stack (10) incorporating the fuel cell separator is installed.

In the above fuel cell separator, the second communication hole provided in the passage sealing bead that surrounds the air vent passage may be located at the uppermost portion of the inner peripheral wall of the passage sealing bead in the installed state.

In the above fuel cell separator, the coolant drain passage may be formed so as to penetrate through each of the two metal separator plates, and the second communication hole provided in the passage sealing bead that surrounds the coolant drain passage may be located below the center of the coolant drain passage in the installed state in which the fuel cell stack incorporating the fuel cell separator is installed.

In the above fuel cell separator, the second communication hole provided in the passage sealing bead that surrounds the coolant drain passage may be located at the lowermost portion of the inner peripheral wall of the passage sealing bead in the installed state.

The above embodiment discloses the fuel cell stack including the above-described fuel cell separator and the membrane electrode assembly (28*a*), and a plurality of the fuel cell separators and a plurality of the membrane electrode assemblies are alternately stacked.

The present invention is not limited to the above disclosure, and various modifications are possible without departing from the essence and gist of the present invention.

The invention claimed is:

1. A fuel cell separator comprising two metal separator plates joined to each other, each of the two metal separator plates including a first surface formed with a reactant gas flow field configured to flow a reactant gas which is a fuel gas or an oxygen-containing gas and a second surface formed with a coolant flow field configured to flow a coolant, wherein the fuel cell separator includes a reactant gas passage that is formed so as to penetrate through the fuel cell separator in a separator thickness direction thereof, the reactant gas passage communicating with the reactant gas flow field, and a bead is formed on the first surface so as to protrude therefrom, the bead including a sealing bead provided in order to prevent leakage of the reactant gas, wherein the fuel cell separator further includes an air vent passage that is formed so as to penetrate through the fuel cell separator in the separator thickness direction, the second surface includes a connection channel formed by a recess forming a back of a protruding shape of the bead, the air vent passage is configured to communicate with the coolant flow field via the connection channel such that the air vent passage releases air in the coolant, the sealing bead includes a passage sealing bead surrounding the air vent passage, the passage sealing bead includes an outer peripheral wall and an inner peripheral wall that extend in pairs, and an internal channel that is formed between the outer peripheral wall and the inner peripheral wall and that extends so as to surround the air vent passage, the outer peripheral wall includes a first communication hole configured to allow the internal channel of the passage sealing bead and the connection channel to communicate with each other, the inner peripheral wall includes a second communication hole configured to allow the internal channel of the passage sealing bead and the air vent passage to communicate with each other, the first communication hole and the second communication hole are aligned with an axis of the air vent passage, the first communication hole and the second communication hole are displaced from each other in an extending direction of the internal channel, and separated from one another by at least a diameter of the inner channel, and the air vent passage is provided separately from the reactant gas passage.

2. The fuel cell separator according to claim 1, further comprising:

a tunnel extending from the inner peripheral wall toward the air vent passage, wherein an internal space of the tunnel communicates with the internal channel via the second communication hole.

3. The fuel cell separator according to claim 1, wherein the air vent passage is formed so as to penetrate through each of the two metal separator plates, and the second communication hole provided in the passage sealing bead that surrounds the air vent passage is located above a center of the air vent passage in an installed state in which a fuel cell stack incorporating the fuel cell separator is installed.

4. The fuel cell separator according to claim 3, wherein the second communication hole provided in the passage sealing bead that surrounds the air vent passage is located at an uppermost portion of the inner peripheral wall of the passage sealing bead in the installed state.

5. A fuel cell stack comprising:

a fuel cell separator; and a membrane electrode assembly, the fuel cell separator comprising two metal separator plates joined to each other, each of the two metal separator plates including a first surface formed with a reactant gas flow field configured to flow a reactant gas which is a fuel gas or an oxygen-containing gas and a second surface formed with a coolant flow field configured to flow a coolant, wherein the fuel cell separator includes a reactant gas passage that is formed so as to penetrate through the fuel cell separator in a separator thickness direction thereof, the reactant gas passage communicating with the reactant gas flow field, and a bead is formed on the first surface so as to protrude therefrom, the bead including a sealing bead provided in order to prevent leakage of the reactant gas, wherein the fuel cell separator further includes an air vent passage that is formed so as to penetrate through the fuel cell separator in the separator thickness direction, the second surface includes a connection channel formed by a recess forming a back of a protruding shape of the bead, the air vent passage is configured to communicate with the coolant flow field via the connection channel such that the air vent passage releases air in the coolant, the sealing bead includes a passage sealing bead surrounding the air vent passage, the passage sealing bead includes an outer peripheral wall and an inner peripheral wall that extend in pairs, and an internal channel that is formed between the outer peripheral wall and the inner peripheral wall and that extends so as to surround the air vent passage, the outer peripheral wall includes a first communication hole configured to allow the internal channel of the passage sealing bead and the connection channel to communicate with each other, the inner peripheral wall includes a second communication hole configured to allow the internal channel of the passage sealing bead and the air vent passage to communicate with each other, and the first communication hole and the second communication hole are aligned with an axis of the air vent passage, the first communication hole and the second communication hole are displaced from each other in an extending direction of the internal channel, and separated from one another by at least a diameter of the inner channel, the air vent passage is provided separately from the reactant gas passage, and the fuel cell separator comprises a plurality of fuel cell separators, the membrane electrode assembly comprises a plurality of membrane electrode assemblies, and the plurality of fuel cell separators and the plurality of membrane electrode assemblies are alternately stacked.

6. The fuel cell stack according to claim 5, wherein the fuel cell separator further comprises a tunnel extending from the inner peripheral wall toward the air vent passage, and an internal space of the tunnel communicates with the internal channel via the second communication hole.

7. The fuel cell stack according to claim 5, wherein the air vent passage is formed so as to penetrate through each of the two metal separator plates, and the second communication hole provided in the passage sealing bead that surrounds the air vent passage is located above a center of the air vent passage in an installed state in which the fuel cell stack incorporating the fuel cell separator is installed.

8. The fuel cell stack according to claim 7, wherein the second communication hole provided in the passage sealing bead that surrounds the air vent passage is located at an uppermost portion of the inner peripheral wall of the passage sealing bead in the installed state.

9. A fuel cell separator comprising two metal separator plates joined to each other, each of the two metal separator plates including a first surface formed with a reactant gas flow field configured to flow a reactant gas which is a fuel gas or an oxygen-containing gas and a second surface formed with a coolant flow field configured to flow a coolant, wherein the fuel cell separator includes a reactant gas passage that is formed so as to penetrate through the fuel cell separator in a separator thickness direction thereof, the reactant gas passage communicating with the reactant gas flow field, and a bead is formed on the first surface so as to protrude therefrom, the bead including a sealing bead provided in order to prevent leakage of the reactant gas, wherein the fuel cell separator further includes a coolant drain passage that is formed so as to penetrate through the fuel cell separator in the separator thickness direction, the second surface includes a connection channel formed by a recess forming a back of a protruding shape of the bead, the coolant drain passage is configured to communicate with the coolant flow field via the connection channel such that the coolant drain passage releases the coolant, the sealing bead includes a passage sealing bead surrounding the coolant drain passage, the passage sealing bead includes an outer peripheral wall and an inner peripheral wall that extend in pairs, and an internal channel that is formed between the outer peripheral wall and the inner peripheral wall and that extends so as to surround the coolant drain passage, the outer peripheral wall includes a first communication hole configured to allow the internal channel of the passage sealing bead and the connection channel to communicate with each other, the inner peripheral wall includes a second communication hole configured to allow the internal channel of the passage sealing bead and the coolant drain passage to communicate with each other, the first communication hole and the second communication hole are aligned with an axis of the coolant drain passage, the first communication hole and the second communication hole are displaced from each other in an extending direction of the internal channel, and separated from one another by at least a diameter of the inner channel, each of the two metal separator plates is provided with a coolant supply passage configured to supply a coolant to the coolant flow field and a coolant discharge passage configured to discharge the coolant having flowed through the coolant flow field, the coolant supply passage and the coolant discharge passage being formed so as to penetrate through each of the two metal separator plates, and the coolant drain passage is provided separately from the coolant supply passage and the coolant discharge passage.

10. The fuel cell separator according to claim 9, wherein the coolant drain passage is formed so as to penetrate through each of the two metal separator plates, and the second communication hole provided in the passage sealing bead that surrounds the coolant drain passage is located below a center of the coolant drain passage in an installed state in which a fuel cell stack incorporating the fuel cell separator is installed.

11. The fuel cell separator according to claim 10, wherein the second communication hole provided in the passage sealing bead that surrounds the coolant drain passage is located at a lowermost portion of the inner peripheral wall of the passage sealing bead in the installed state.

* * * * *